(12) United States Patent
Liang et al.

(10) Patent No.: US 7,272,463 B2
(45) Date of Patent: Sep. 18, 2007

(54) GOUGE AND INTERFERENCE AVOIDANCE IN SURFACE CONTOURING

(75) Inventors: Erwin Wenti Liang, Ballston Lake, NY (US); Vinod Padmanabhan Kumar, Guilderland, NY (US)

(73) Assignee: General Electric Company, Niskayuna, NY (US)

( * ) Notice: Subject to any disclaimer, the term of this patent is extended or adjusted under 35 U.S.C. 154(b) by 71 days.

(21) Appl. No.: 11/135,793

(22) Filed: May 24, 2005

(65) Prior Publication Data

US 2006/0271233 A1 Nov. 30, 2006

(51) Int. Cl.
*G06F 19/00* (2006.01)
*G06F 11/30* (2006.01)

(52) U.S. Cl. .................. 700/178; 700/175; 700/177; 700/159; 700/174

(58) Field of Classification Search ............... 700/190, 700/191, 178, 186, 187, 159
See application file for complete search history.

(56) References Cited

U.S. PATENT DOCUMENTS

| | | | |
|---|---|---|---|
| 4,922,440 A | | 5/1990 | Kawamura et al. |
| 5,122,966 A | * | 6/1992 | Jansen et al. ............... 700/178 |
| 5,416,715 A | * | 5/1995 | Kinoshita et al. .......... 700/178 |
| 5,734,573 A | * | 3/1998 | Niwa ........................ 700/178 |
| 6,632,053 B2 | * | 10/2003 | Koch ........................ 409/132 |

2004/0120136 A1 6/2004 Olczak et al.

FOREIGN PATENT DOCUMENTS

| | | |
|---|---|---|
| EP | 0 165 999 | 1/1986 |
| EP | 0 429 276 | 3/2005 |
| WO | WO 2004/061536 | 7/2004 |

OTHER PUBLICATIONS

PCT International Search Report dated Sep. 29, 2006.
Yuan-Shin Lee, "Admissible Tool Orientation Control of Gouging Avoidance for 5-Axis Complex Surface Machining", Computer Aided Design, Elsevier Publishers, vol. 29, No. 7m ∞. 507-521, XP004063891, Jul. 1997.

* cited by examiner

*Primary Examiner*—Zoila Cabrera
*Assistant Examiner*—Nate Laughlin
(74) *Attorney, Agent, or Firm*—Andrew J. Caruso; William E. Powell, III

(57) ABSTRACT

A method of determining a tool geometry and tool orientation for any prescribed path along a workpiece of a cutting tool is described. A parameter set is provided, where parameters of the parameter set include tool geometry and tool orientation relative to a surface of the workpiece. Values of the parameters in the parameter set are determined such that no local interference or global interference occurs, where local interference occurs when a portion of the tool immediately adjacent a cutting edge of the tool contacts a sidewall of a groove already cut by the cutting edge, and global interference occurs when a portion of the tool away from the cutting edge contacts a sidewall of a groove already cut by the cutting edge.

5 Claims, 8 Drawing Sheets

GOUGE AND INTERFERENCE AVOIDANCE IN SURFACE CONTOURING

BACKGROUND OF THE INVENTION

Microstructured surfaces have been widely used for many applications such as diffusers, solar cell panels, prismatic retroreflective films, microfluidics, and control surfaces for flow and heat/mass transfer. In a wide range of optical applications surfaces are textured to redirect, redistribute, or diffuse light to enhance brightness, diffusion, or reflection. Micro channels are machined on heat sinks for power electronics to improve the cooling efficiency. Microfluidic devices embedded with micro channels have been used for clinical diagnostics, chemical synthesis, biomedical analysis, etc. These micro-scale features are produced on surfaces with high precision and accuracy, and usually transferred to the surfaces of final products with a tool fabricated from a master containing the desired microstructure. The master may be produced using various micro-machining techniques, such as precision milling or turning, on a workpiece typically made of machinable metals like copper or nickel.

Machining defects produced on masters such as scratches, burrs, and gouges can be detrimental to esthetics of the products or to the desired functionality and performance such as optical, heat transfer, and flow. These defects are mainly caused by the interference of a cutting tool with the machined surfaces, such as by the cutting tool flank, or side surfaces, rubbing against already machined surfaces, during the tool traversal on the workpiece surface.

SUMMARY OF THE INVENTION

According to one embodiment of the invention, a method of determining a tool geometry and tool orientation for any prescribed path along a workpiece of a cutting tool is provided. The method comprises: providing a parameter set, where parameters of the parameter set include tool geometry and tool orientation relative to a surface of the workpiece; determining values of the parameters in the parameter set such that no local interference or global interference occurs, where local interference occurs when a portion of the tool immediately adjacent a cutting edge of the tool contacts a sidewall of a groove already cut by the cutting edge, and global interference occurs when a portion of the tool away from the cutting edge contacts a sidewall of a groove already cut by the cutting edge; and providing a physical cutting tool and tool orientation according to the determined values of the parameters to avoid interference.

These and other aspects, advantages, and salient features of the present invention will become apparent from the following detailed description, the accompanying drawings, and the appended claims.

DETAILED DESCRIPTION OF THE PREFERRED EMBODIMENTS

Figure 1:
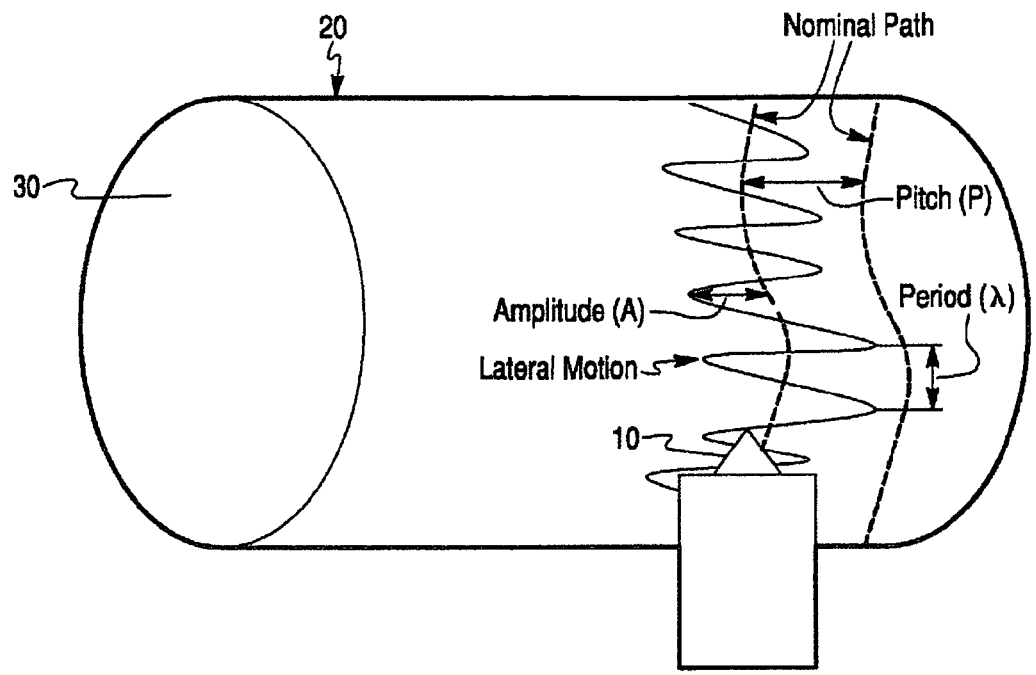
FIG. 1 is a schematic illustrating an example of a cutting tool 10 cutting into a cylindrical workpiece surface according to an embodiment of the invention.

In the following description, like reference characters designate like or corresponding parts throughout the several views shown in the figures. It is also understood that terms such as "top," "bottom," "outward," "inward," and the like are words of convenience and are not to be construed as limiting terms.

Gouge and Interference Avoidance

According to one aspect of the invention, the present inventors have realized that by carrying out a virtual simulation of the cutting tool geometry, tool orientation, and tool path prior to physically carrying out the microstructure machining, machining defects caused by the cutting tool interfering with the already machined surface during the cutting tool traversal can be avoided. By determining a value range of the parameter set of the tool geometry and tool orientation for a prescribed tool path that will avoid interferences in a virtual fashion, costly and time consuming microstructure machining to determine interferences can be avoided, while still maintaining the desired geometry of the machined microstructure.

In embodiments of the invention, a mathematical model is provided to model the tool geometry, and tool orientation to allow the identification of any interferences of the cutting tool with the machined surfaces of a workpiece surface during the traversal of the cutting tool along the tool path.

Figure 2:
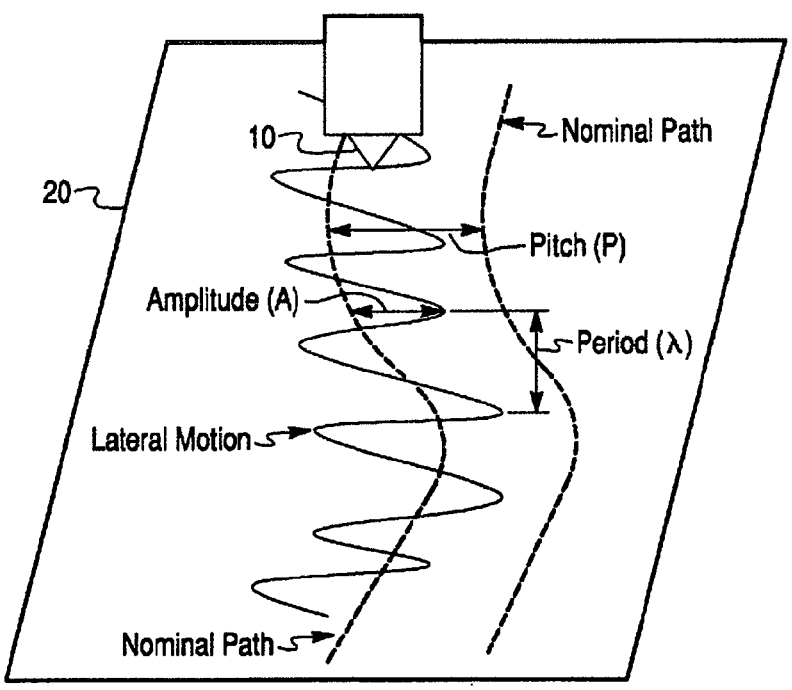
FIG. 2 illustrates a section of the workpiece shown in FIG. 1 in greater detail.

FIG. 1 is a schematic illustrating an example of a cutting tool 10 cutting into a workpiece surface of a workpiece 20. The cutting tool 10 follows a nominal path along the z-direction with lateral modulation in the x-direction perpendicular to the z-direction. The direction into the workpiece is perpendicular to the x-z plane. The modulation in the lateral x-direction may be sinusoidal in nature characterized by a period or wavelength $\lambda$, for example. The distance between grooves cut by the cutting tool 10 is given by the pitch P. In FIG. 1, the workpiece 20 is supported on a drum 30. The cutting tool 10 may be diamond, for example. FIG. 2 illustrates a section of the workpiece in greater detail.

Figure 3:
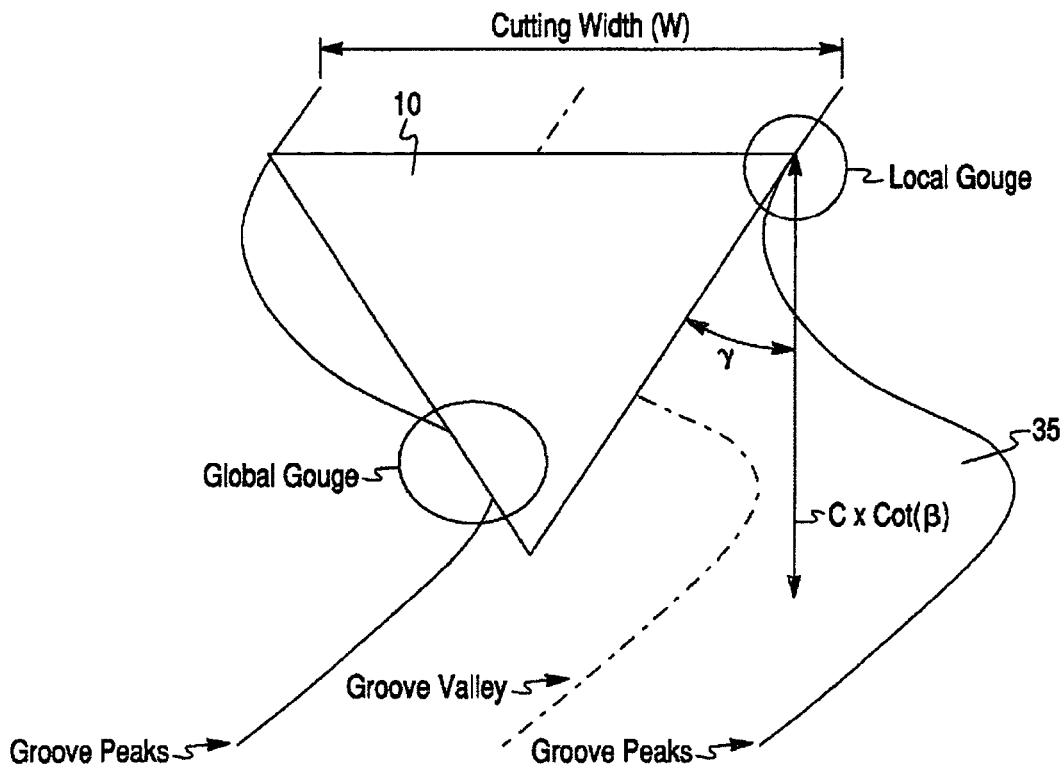
FIG. 3 is a schematic illustrating the concepts of gouging or interference as a cutting tool traverses its tool path.

FIG. 3 is a schematic illustrating the concepts of gouging or interference as a cutting tool 10 traverses its tool path. FIG. 3 illustrates a cross-section of the tool 10 in the x-z plane of the tool 10 with a cutting width W, as the tool 10 cuts a groove 35 characterized by a groove valley (the deepest point of the groove) and groove peaks (the highest points of the groove). As the tool 10 traverses its path, a cutting edge at the front of the tool 10 cuts the groove 35.

A global gouge may occur when a portion of the tool 10 away from cutting edge then contacts a sidewall of the already cut groove and thus removes material from the sidewall. In this case global interference occurs.

A local gouge may occur when a portion of the tool 10 immediately adjacent the cutting edge contacts a sidewall of the already cut groove and thus removes material from the sidewall. Local gouging often occurs as a rubbing of the tool against a sidewall of an already cut groove. In this case local interference occurs.

In general, the mathematical model to be applied to determine the parameter value range over which local and global interference occurs will depend upon the particular parameters of the tool geometry, and tool orientation for a prescribed path along the workpiece. For the sake of illustration, an example of a mathematical model for a particular parameter set is provided below. The present invention, however, is not limited to a particular parameter set of tool geometry, tool orientation, and path.

Figure 4:
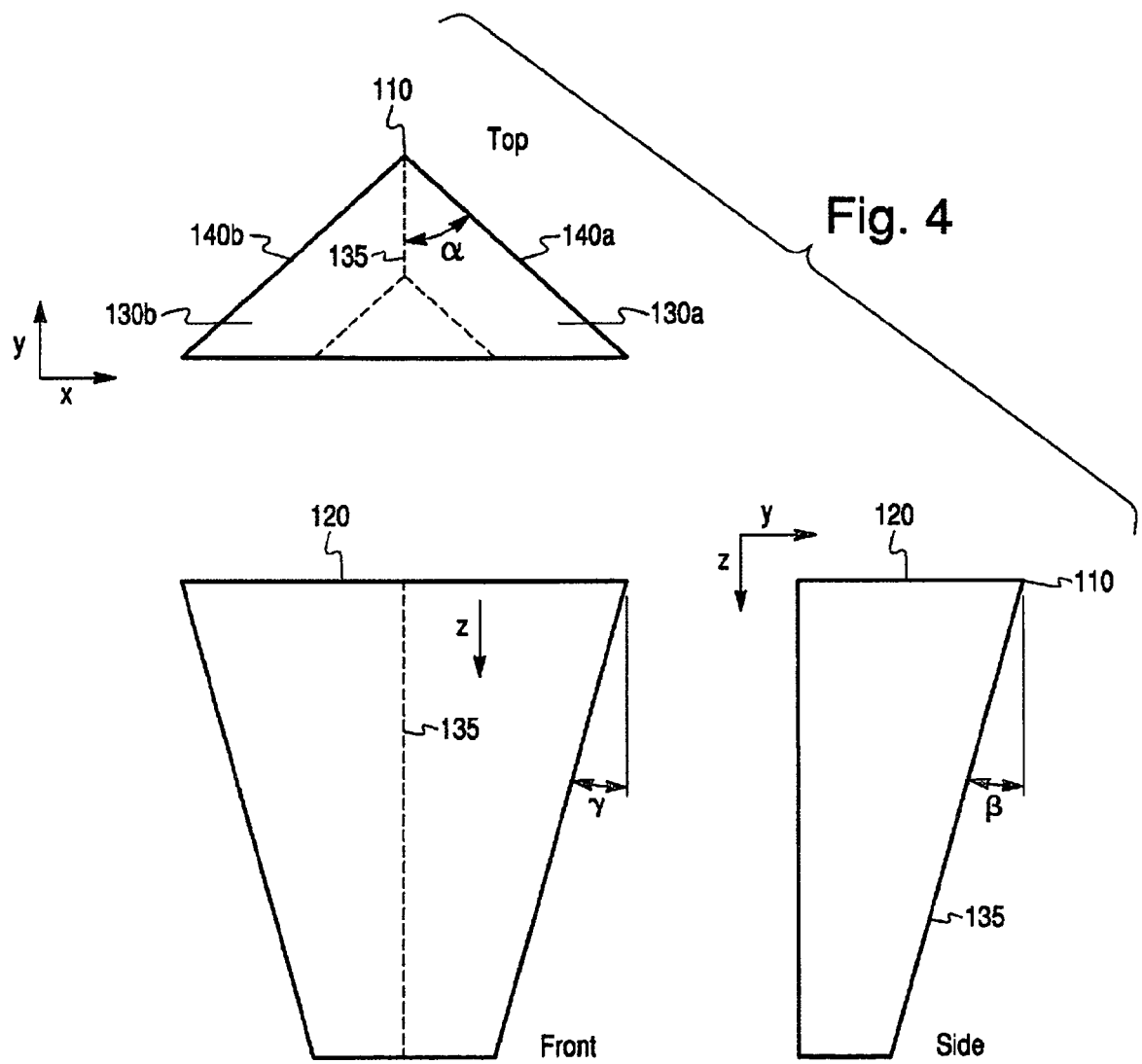
FIG. 4 illustrates different views of portions of a cutting tool according to an embodiment of the invention.

FIG. 4 illustrates different views, top, front, and side, of portions of a cutting tool according to one example. In this example, the nominal path of the cutting tool is taken to be the z-direction with a modulation in the lateral x-direction, and the direction into the workpiece is perpendicular to x-z plane, i.e., in the y-direction. The tool geometry of the tool 10 illustrated in FIG. 4 includes a tool tip 110, which is at the point of the deepest penetration into the workpiece surface, a top cutting face 120, a first side clearance face 130A and a second side clearance face 130B. The top cutting face 120 faces the z-direction, and the side clearance faces 130A, 130B are to the side of the top cutting face 120. The first side clearance face 130A and the second side clearance face 130B intersect at an intersecting line 135. The first side clearance face 130A and the second side clearance face 130B have a first cutting edge 140A and second cutting edge 140B, respectively, at their intersection with the top cutting face 120.

The side clearance faces 130A and 130B make an angle γ with respect to the z direction. Thus, γ is the side clearance angle. While FIG. 4 illustrates the side clearance faces 130A and 130B make an angle of the same magnitude with respect to the z direction, the invention is not limited to the case where the side clearance faces 130A and 130B make an angle of the same magnitude with respect to the z direction.

The intersecting line 135 makes an angle β with respect to the x-z plane (the plane of the workpiece surface) as can be seen in FIG. 4. β is the front clearance angle.

For movement of the cutting tool 10 during machining along its nominal path (z direction) with modulation in the x-direction, the position of the tool tip may be expressed as a function of time, t, as follows: [X(t), 0, Z(t)], where the position in the y-direction is taken to have a constant value throughout the motion of 0, Z(t) is the value of position along z-axis at time t, and X(t) is the value of the position along x-axis at time t.

In the instance that the workpiece is supported on a rotating drum, for example, the y-direction is the radial direction relative to the axis of the drum. The tool tip is positioned at a constant radial distance from the drum axis during the motion of the tool along its path, and thus the position of the tool tip in the y direction does not change.

Any point on the first clearance face 130A (CF1) and second clearance face 130B (CF2) can be parameterized in the x-z plane with respect to the tool tip as follows:

$$PCF1(t)=[X(t)+s.\sin(\alpha)-d.\sin(\gamma), -s.\cos(\alpha), Z(t)-d.\cos(\gamma)],$$

$$PCF2(t)=[X(t)-s.\sin(\alpha)+d.\sin(\gamma), -s.\cos(\alpha), Z(t)-d.\cos(\gamma)] \quad (EQ. 1),$$

where PCF1(t) is a point on the first clearance face 130A at a time t, PCF2(t) is a point of the second clearance face 130B at time t, Z(t) is the value of the position of the tool tip along the z-axis at time t, X(t) is the value of position of the tool tip along the x-axis at time t, α is the half included angle, and γ is the side clearance angle. d is given by the equation d.sin(γ)=Δz.tan(γ), where Δz is the distance between the tool tip and the point on clearance face.

The normal directions to first and second clearance faces 130A, 130B are given by:

$$N\text{-}CF1: [\cos(\phi).\cos(\alpha), \cos(\phi).\sin(\alpha), -\sin(\phi)],$$

$$N\text{-}CF2: [\cos(\phi).\cos(\alpha), \cos(\phi).\sin(\alpha), -\sin(\phi)] \quad (EQ. 2),$$

where N-CF1 is the normal direct to the first clearance face 130A, N-CF2 is the normal direct to the second clearance face 130B, and (π/2-φ) is the angle between the first clearance face 130A and the top cutting face 120.

The side clearance angle γ may be expressed in terms of φ and the half included angle α as follows:

$$\gamma = \tan^{-1}\left[\frac{\tan(\phi)}{\cos(\alpha)}\right]. \quad (EQ. 3)$$

Figure 5:
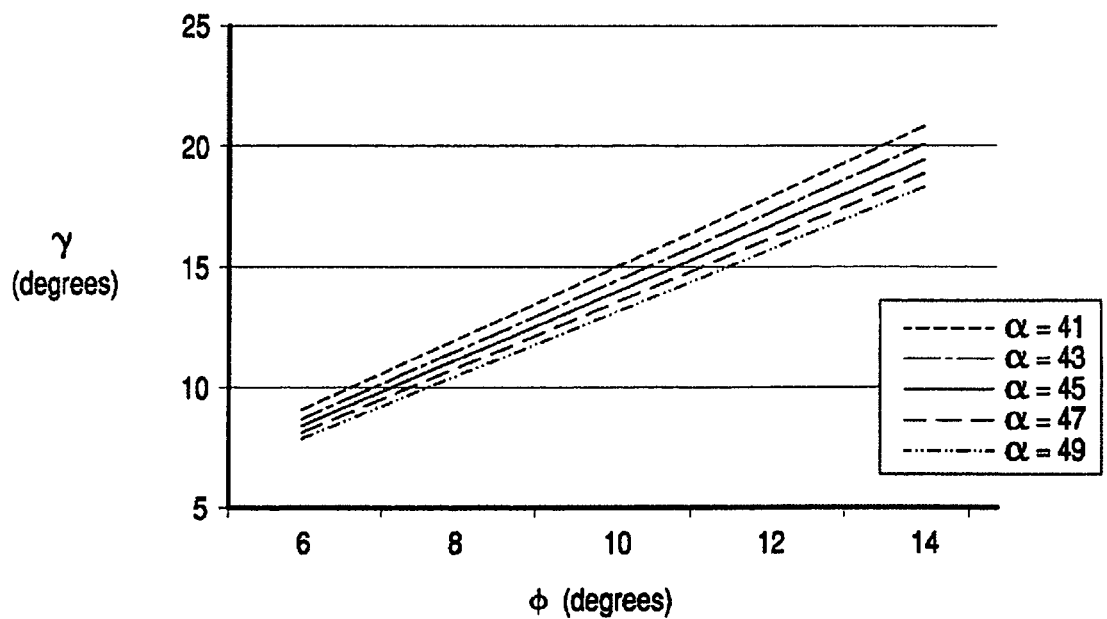
FIG. 5 is a graph illustrating the side clearance angle $\gamma$ as a function of $\phi$ for different values of half included angle $\alpha$.

FIG. 5 shows γ as a function of φ for values of α between 41 and 49, inclusive.

The front clearance angle, β, which is the angle between the z-axis and the intersection line 135 of the two side clearance faces 130A and 130B, may be expressed in terms of φ and the half included angle α as follows:

$$\beta = \cos^{-1}\left[\frac{\sin(\alpha)\cdot\cos(\phi)}{\sqrt{\sin^2(\phi)+\cos^2(\phi)\cdot\sin^2(\alpha)}}\right] = \tan^{-1}\left[\frac{\tan(\phi)}{\sin(\alpha)}\right]. \quad (EQ. 4)$$

The tool motion [X(t), 0, Z(t)] can be re-parameterized as [X(Z), 0, Z] by eliminating the time variable, to allow for the derivation of the conditions for interference. Any point on the clearance faces 130A or 130B traverses a planar curve in the x-z plane, i.e., the trajectory of any point on the clearance face (including points on the cutting edge) is planar. This is so because we have taken the situation where the Y co-ordinate of any point remains the same during the entire motion, i.e., the tool 10 does not move up or down into the workpiece while the tool 10 is traversing its tool path.

Figure 6:
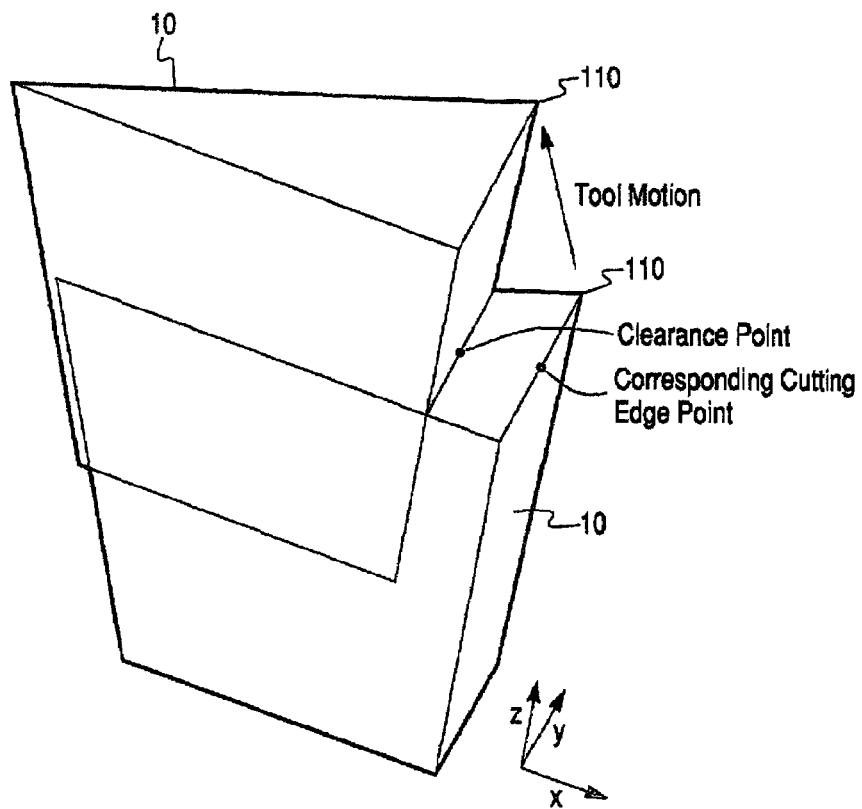
FIG. 6 is a schematic illustrating the cutting tool at two positions along its tool path in the case of no interference.
Figure 7:
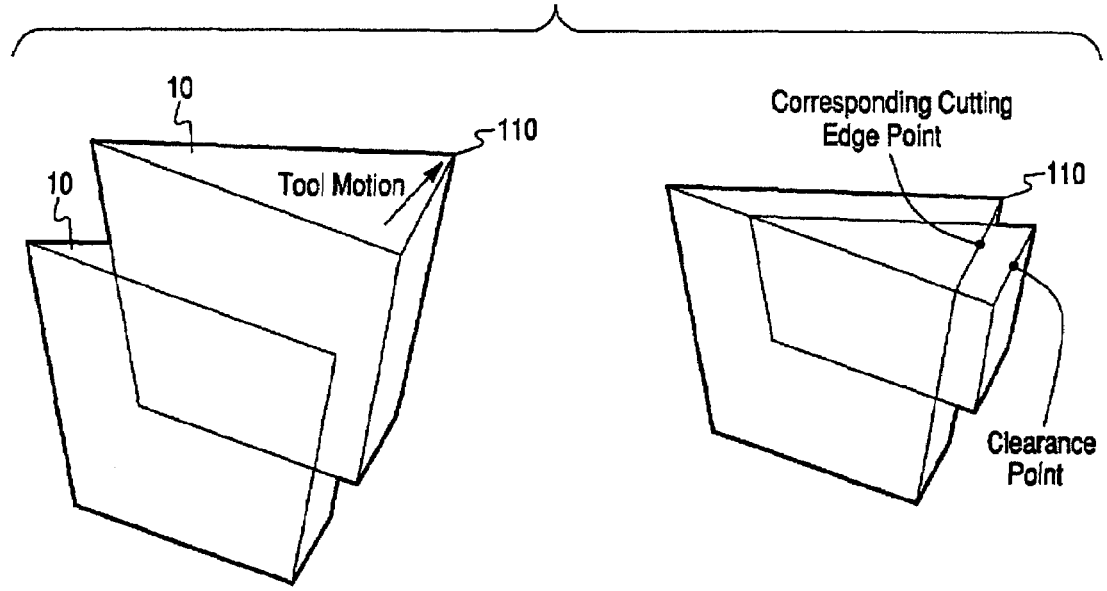
FIG. 7 is a schematic illustrating the cutting tool at two positions along its tool path in the case of interference.

FIGS. 6 and 7 show the tool at two positions along its tool path as an aid in explaining the conditions for interference.

FIG. 6 shows the tool in two locations, as the tool traverses from time t=t1 to time t=t2, which correspond to tool tip positions on the z-axis of Z=z1 and Z=z2, respectively. At time t=t2, where Z=z2, the clearance point, i.e, a point on one of the clearance faces, is in a location which has been already cut during the tool motion. This can be shown by comparing the x-coordinate of the clearance point with the x-coordinate of the corresponding cutting edge point. As the trajectory of any point is planar in the x-z plane, and the y-coordinate remains the same, the clearance point and the corresponding cutting edge point will have the same y-coordinate. Because the coordinate of the clearance point is in a location which has already been cut, there is no interference for that clearance point.

FIG. 7 also shows the tool in two locations, as the tool traverses from t=t1 to t=t2 (equivalently, Z=z1 to Z=z2). At t=t2 (Z=z2), the clearance point is in a location beyond the region that has already been cut during this tool motion. Thus, FIG. 7 illustrates a situation where there is interference of the clearance point.

In general to check for interference of a point of one of the clearance faces with the workpiece, the following steps may be taken: First, for any point on the clearance face, PCF1 (point on first clearance face 130A) or PCF2 (point on second clearance face 130B), identify the corresponding point on the cutting edge, PCE1 (point on first cutting edge) or PCE2 (point on second cutting edge) having the same y-coordinate. Second, compare the x-position of this point, PCF1 (or PCF2), to the x-position of the cutting edge point, PCE1 (or PCE2), when PCE1 (or PCE2) was at same z-position as PCF1 (or PCF2).

Mathematically, the conditions for no interference for the first clearance face 130A is $X(\text{PCF1}, t=t2) < X(\text{PCE1}, t=t1)$, where $Y(\text{PCF1})=Y(\text{PCE1})$ (EQ. 5A), and, for the second clearance face 130B is $X(\text{PCF2}, t=t2) > X(\text{PCE2}, t=t1)$, where $Y(\text{PCF2})=Y(\text{PCE2})$ (EQ. 5B).

Noting that for all points on first and second cutting edge 140A, 140B, d=0, and using EQ. 1 and EQs. 5A and 5B, the following conditions for no interference can be derived. For clearance face 1:

$X(t2)+s.\sin(\alpha)-d.\sin(\gamma) < X(t1)+s.\sin(\alpha)$ $\Rightarrow X(t2)-d.\sin(\gamma) < X(t1)$ $\Rightarrow X(t2)-X(t1) < d.\sin(\gamma)$, and, for the clearance face 2

$X(t2)-s.\sin(\alpha)+d.\sin(\gamma) > X(t1)-s.\sin(\alpha)$ $\Rightarrow X(t2)+d.\sin(\gamma) > X(t1)$ $\Rightarrow X(t2)-X(t1) > -d.\sin(\gamma)$.

Both of these two conditions must hold simultaneously at any given instant to avoid interference at both PCF1 and PCF2, and thus the condition for no interference is given by:

$-d.\sin(\gamma) < X(t2)-X(t1) < d.\sin(\gamma)$ (EQ. 6).

Noting that $d.\sin(\gamma)=\Delta z.\tan(\gamma)$, the time variable may be eliminated resulting in the condition for no interference expressed in terms of the X position expressed in terms of the Z position:

$-\Delta Z.\tan(\gamma) < X(Z2) - X(Z1) < \Delta Z.\tan(\gamma) \Rightarrow$ (EQ. 7)

$-\Delta Z.\tan(\gamma) < X(Z) - X(Z - \Delta Z) < \Delta Z.\tan(\gamma) \Rightarrow$ $-\tan(\gamma) < \left[\dfrac{X(Z) - X(Z - \Delta Z)}{\Delta Z}\right] < \tan(\gamma) \Rightarrow$ $\left|\dfrac{X(Z) - X(Z - \Delta Z)}{\Delta Z}\right| < \tan(\gamma).$ As $\Delta z \to 0$, i.e. for points immediately adjacent to one of the cutting edges, $$\left|\dfrac{dX}{dZ}\right| < \tan(\gamma) \qquad \text{(EQ. 8)}$$

From (EQ. 7) and (EQ. 8), we can calculate the minimum clearance angle for no interference:

$$\gamma > \tan^{-1}\left|\dfrac{X(Z) - X(Z - \Delta Z)}{\Delta Z}\right|,$$

where $||$ denotes the absolute value.

Given that the angle of the tool path with respect to the z-axis is $\theta$, the condition for non interference is found to be:

$-\tan(\gamma) < \tan(\theta) < \tan(\gamma)$ $\Rightarrow \theta < \gamma$ (using absolute values) (EQ. 9).

Figure 8:
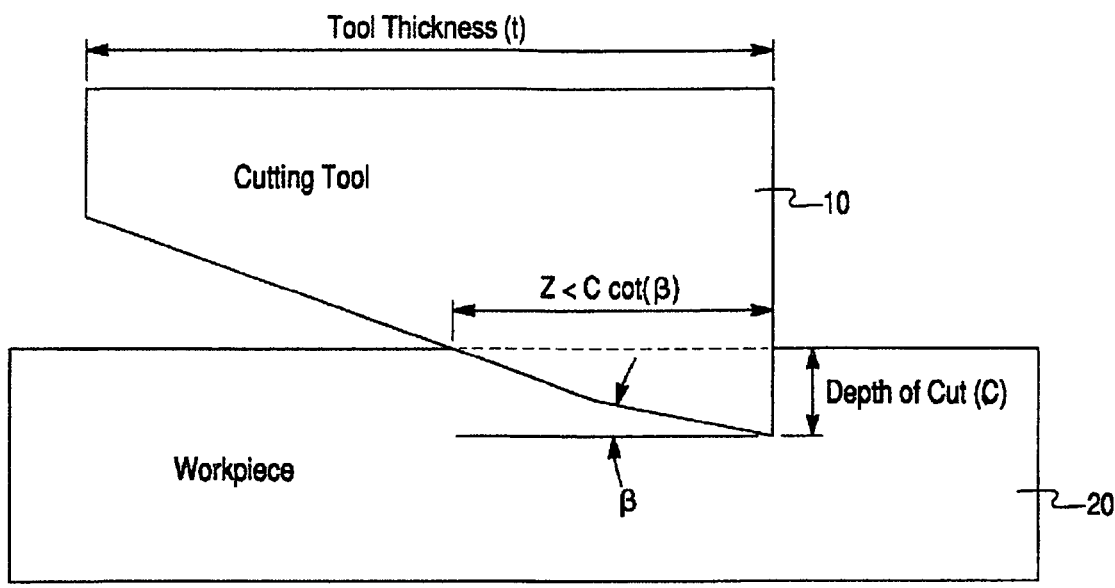
FIG. 8 is a side cross sectional view illustrating the geometry for determining the amount of cutting tool that lies in the region recently cut.

EQ. 8 provides the condition for avoiding interference for points immediately adjacent to the cutting edge (as $\Delta z \to 0$), i.e, for avoiding local interference. To determine the conditions for global interference a wider range of $\Delta Z$ in EQ. 7 should be evaluated. The range to be evaluated depends on the depth of cut into the workpiece. The amount of the tool along the z direction (cut direction) that lies within the region that was recently cut should be evaluated to determine if interference has occurred in that region. FIG. 8 illustrates the geometry for determining the amount of tool that lies in the region that has been recently cut, in which a secondary clearance angle is larger than the primary clearance angle $\beta$, where the primary clearance angle $\beta$ is the clearance angle near the tool tip and the secondary clearance angle is the clearance angle further from the tip. For a cut depth C, the range of $\Delta Z$ to be determined is:

$$0 < \Delta Z < \dfrac{C}{\tan(\beta)},$$

or equivalently, $$\Delta Z = \dfrac{\tau}{\tan(\beta)}; \text{ for } 0 < \tau \leq C,$$

where $\tau$ is the equivalent depth of cut (or distance from tool tip along the y-axis).

Applying this to EQ.7, the condition for no global interference becomes:

$$|X(Z) - X(Z - \Delta Z)| < \left[\dfrac{\tau.\tan(\gamma)}{\tan(\beta)}\right].$$

For $\alpha=45°$ (for a full include angle of 90°), $\gamma=\beta$, and the condition is reduced to:

$|X(Z)-X(Z-\Delta Z)| < \tau$; $0 < \tau \leq C$.

Figure 9:
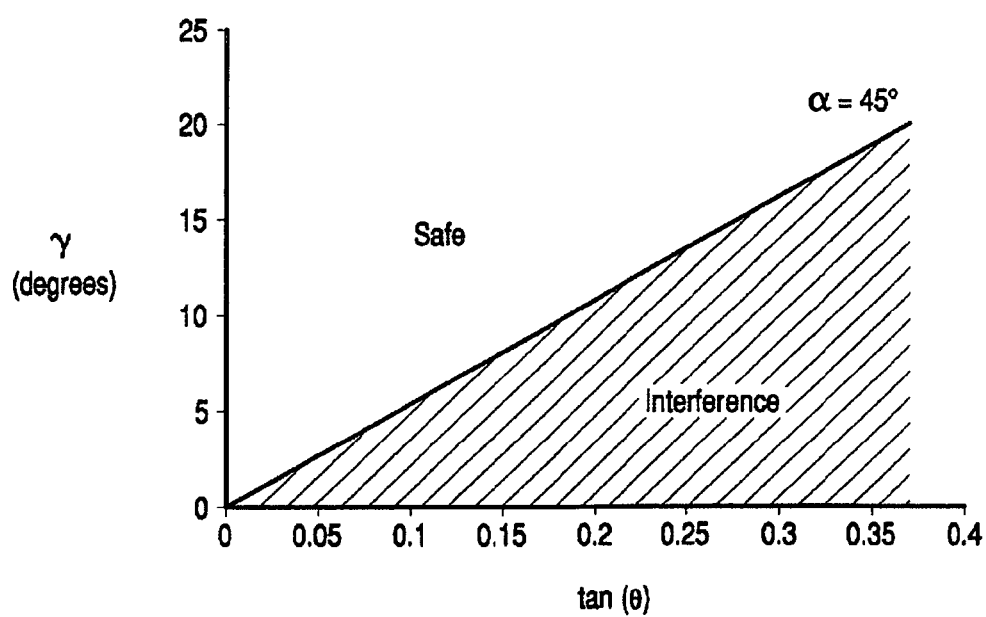
FIG. 9 is a graph illustrating the conditions for no interference for $\alpha=45°$, and $\gamma=\beta$, as a function of $\tan(\theta)$.
Figure 10:
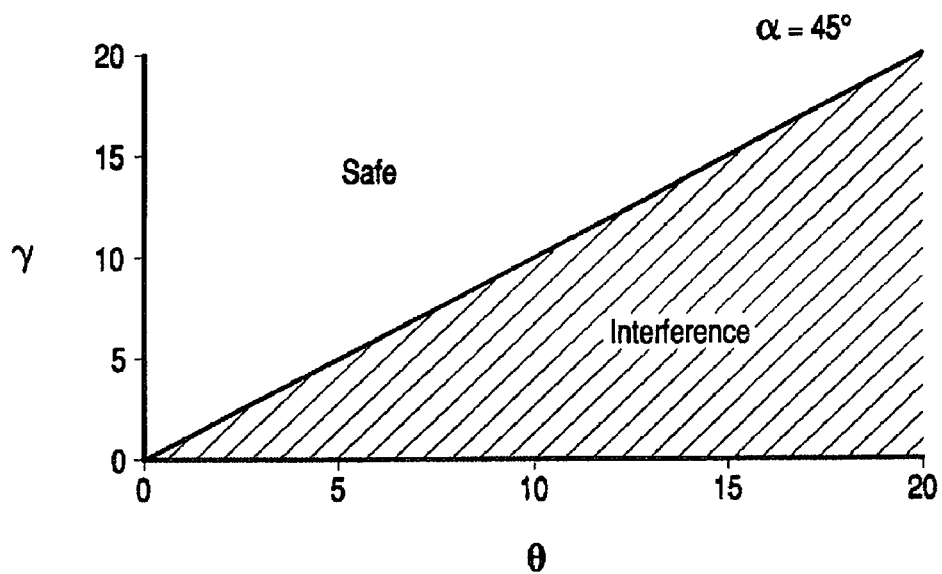
FIG. 10 is a graph illustrating the conditions for no interference for $\alpha=45°$, and $\gamma=\beta$, as a function of $\theta$.

FIGS. 9 and 10 illustrate the conditions for no interference for $\alpha=45°$, and $\gamma=\beta$, as a function of $\tan(\theta)$ and $\theta$, respectively.

Sinusoidal X-Movements:

The conditions for no interference in the case of sinusoidal modulation of the tool in the x-direction can be derived. For sinusoidal modulation in the x-direction, X is given as $$X(t)=A.\sin(Bt) \text{ or, } X(Z)=A.\sin(BZ),$$ (5)

where A is an amplitude, $B=2\pi/\lambda$, and $\lambda$ is a wavelength of the sinusoidal motion.

In this case the condition for no interference from EQ. 7 reduces to $$-\tan(\gamma)<A.B.\cos(BZ)<\tan(\gamma).$$

Given that the minimum and maximum values of cos will be −1 and +1, the condition further reduces to:

$$\gamma > \tan^{-1}(A.B) \qquad (EQ.\ 10)$$

Figure 11:
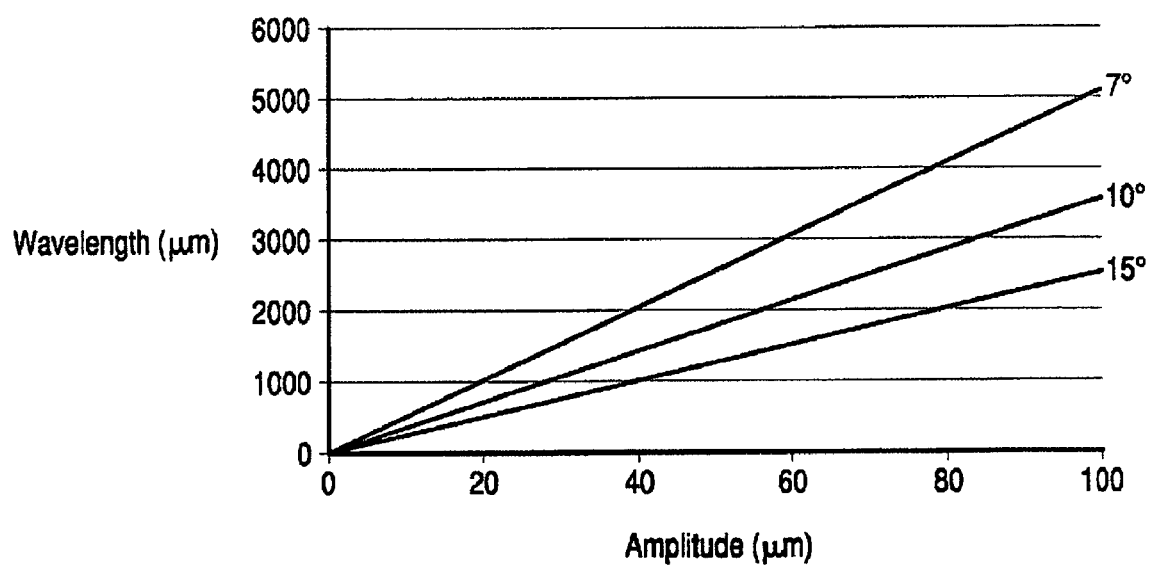
FIG. 11 is a graph illustrating the conditions for no interference for the wavelength as a function of amplitude in a sinusoidal cutting path for $\gamma$ values of 7°, 10°, and 15.

FIG. 11 illustrates the conditions for no interference for the wavelength as a function of amplitude for $\gamma$ values of 7°, 10°, and 15°. Interference occurs for points above the line. There is no interference for points below the line.

As can be seen from FIG. 11, for an amplitude of 42 μm and wavelength of 2 mm, a 7° side clearance angle causes interference while a 10° side clearance angle does not.

Rotation of the Cutting Tool About X-Axis

Rotation of the cutting tool about the x-axis affects the effective front clearance angle. For a rotation angle of δ about the x-axis relative to the unrotated state, a point on the first clearance face 130A and first cutting edge are given as follows.

Rotation of any point PCF1 (point on first clearance face 130A) is given by:

$$[X(t)+s.\sin(\alpha)-d.\sin(\gamma),$$

$$-s.\cos(\alpha).\cos(\delta)-\sin(\delta).(Z(t)-d.\cos(\gamma)),$$

$$-s.\cos(\alpha).\sin(\delta)+\cos(\delta).(Z(t)-d.\cos(\gamma))].$$

Rotation of any point PCE1(t) (point on the first cutting edge) is given by:

$$[X(t)+s.\sin(\alpha),$$

$$-s.\cos(\alpha).\cos(\delta)-\sin(\delta).Z(t),$$

$$-s.\cos(\alpha).\sin(\delta)+\cos(\delta).Z(t)].$$

As the cutting tool traverses along its path rotated at the angle δ, the effective cutting edge is the projection of the rotated cutting edge onto the x-y plane. Any cutting edge point PCE1(t) projected onto the x-y plane becomes:

$$[X(t)+s.\sin(\alpha), -s.\cos(\alpha).\cos(\delta)-\sin(\delta).Z(t), 0].$$

The effective half included angle ($\alpha_n$) is the angle made by the projected cutting edge line with the y-axis, and is given by:

$$\tan(\alpha_n)=[(X(t)+s.\sin(\alpha))/(s.\cos(\alpha).\cos(\delta)+\sin(\delta).Z(t))].$$

Because the projection in the x-y plane is not dependent on the tool position with respect to time, the equation for the effective half included angle, $\alpha_n$, can be shown to reduce to:

$$\tan(\alpha_n)=[\tan(\alpha)]/\cos(\delta) \qquad (EQ.\ 11)$$

Figure 12:
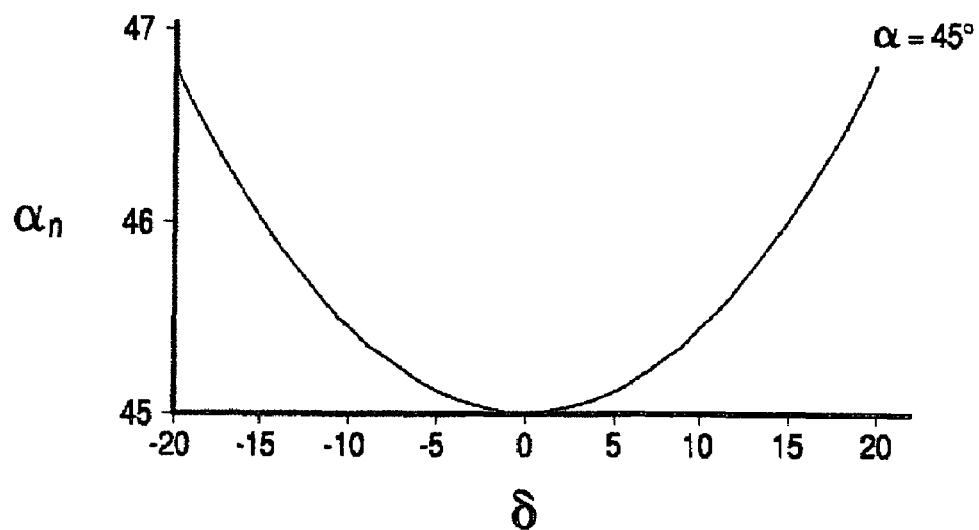
FIG. 12 is a graph illustrating the effective half included angle, $\alpha_n$, as a function of rotation angle, $\delta$, for a half included angle, $\alpha$, of 45°.

FIG. 12 illustrates the effective half included angle, $\alpha_n$, as a function of rotation angle, δ, for a half included angle, α, of 45°.

For an effective included half-angle $\alpha_n$ of 45° (for a total cutting angle of 90°), the half included angle α that the cutting tool must have for a given rotation angle δ is given by:

$$\alpha=\tan^{-1}(\cos(\delta)) \qquad (EQ.\ 12).$$

Figure 13:
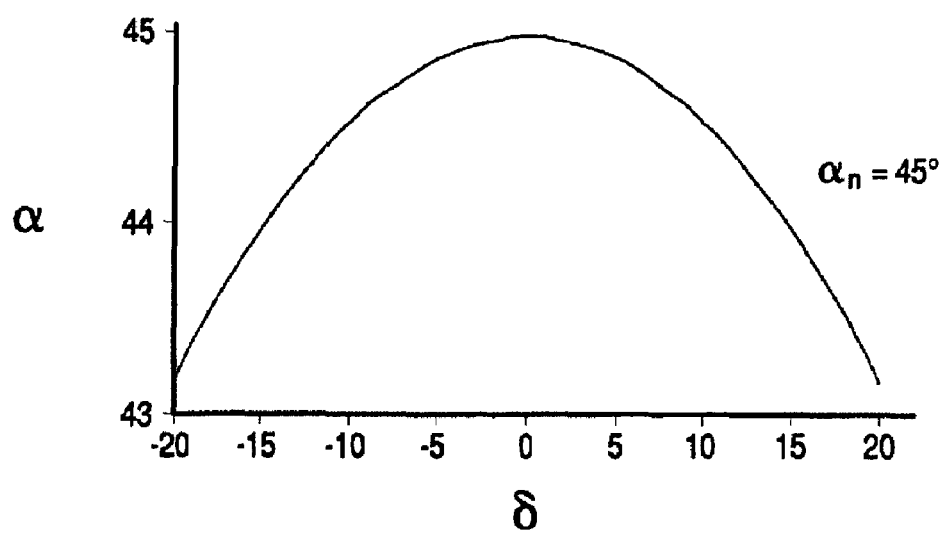
FIG. 13 is a graph illustrating the half included angle, $\alpha$, needed to produce an effective half included angle, $\alpha_n$, of 45° as a function of rotation angle, $\delta$.

FIG. 13 illustrates the half included angle, α, needed to produce an effective half included angle, $\alpha_n$, of 45° as a function of rotation angle, δ.

The effective side clearance angle $\gamma_n$ will depend on the rotation angle δ. The effective side clearance angle $\gamma_n$ may be determined by considering the rotation of the clearance face normal N-CF1 (from EQ. 2) about x-axis by the rotation angle δ. The rotated normals for the first clearance face (CF1) and the second clearance face (CF2) are given by:

Rotated N-CF1: $[\cos(\phi).\cos(\alpha),$ $\cos(\phi).\sin(\alpha).\cos(\delta)+\sin(\phi).\sin(\delta)$ $\cos(\phi).\sin(\alpha).\sin(\delta)-\sin(\phi).\cos(\delta)]$, and Rotated N-CF2: $[-\cos(\phi).\cos(\alpha),$ $\cos(\phi).\sin(\alpha).\cos(\delta)+\sin(\phi).\sin(\delta)$ $\cos(\phi).\sin(\alpha).\sin(\delta)-\sin(\phi).\cos(\delta)].$ The effective clearance angle $\gamma_n$ of a clearance face can be calculated in a similar fashion to EQ. 3, as the angle made by the clearance face at any cross-section that is parallel to the x-y plane. The effective clearance angle $\gamma_n$ may be expressed as:

$$\tan(\gamma_n)=[(\cos(\delta).\sin(\phi)-\sin(\delta).\cos(\phi).\sin(\alpha))/\cos(\phi)\\.\cos(\alpha)] \qquad (EQ.\ 13).$$

Thus, the condition for non-interference from EQ. 7 now becomes:

$$-\tan(\gamma_n)<dX/dZ<\tan(\gamma_n).$$

Figure 14:
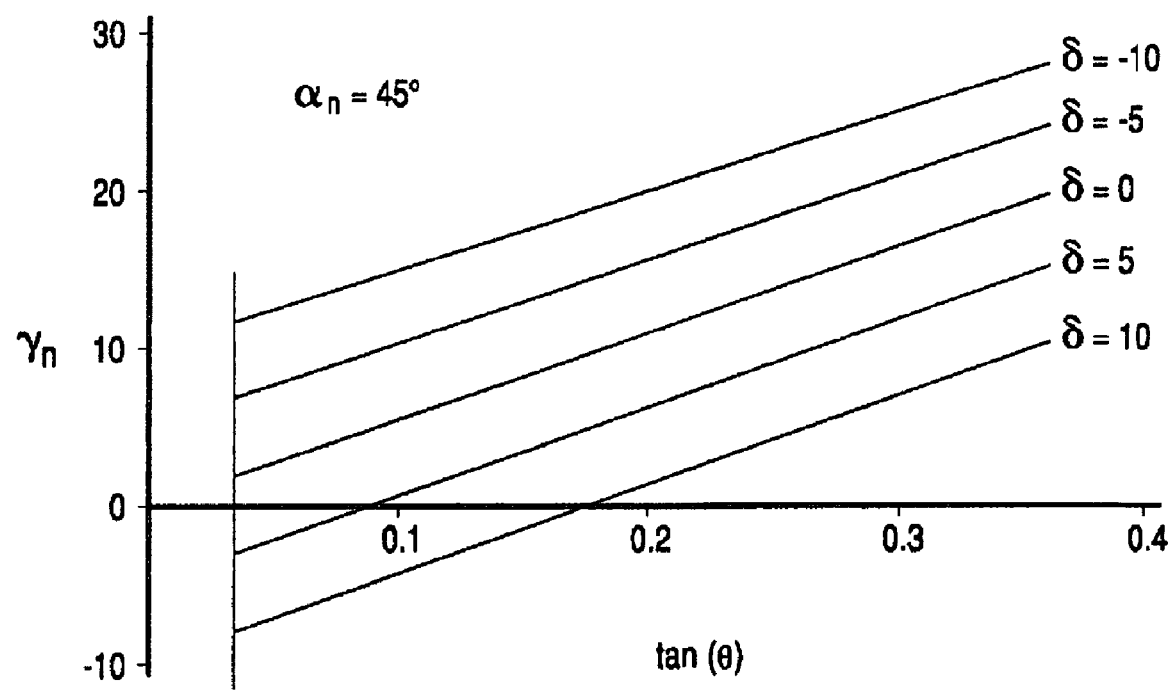
FIG. 14 is a graph illustrating the conditions for no interference for the effective clearance angle $\gamma_n$ as a function of $\tan(\theta)$ for rotation angles $\delta$ of −10°, −5°, 0°, 5° and 10°.

FIG. 14 illustrates the conditions for no interference for the effective clearance angle $\gamma_n$ as a function of tan(θ) for rotation angles δ of −10°, −5°, 0°, 5° and 10°. Interference occurs for points below the line. There is no interference for points above the line.

Error in X-Position Due to Tilt of Cutting Tool

The rotation of the cutting tool by rotation angle δ about the x-axis, produces an error in X-position. When the tip is at a particular z position, the end of the cutting edge (as well as the face) will be at a different z position due to the rotation, thus causing an error in the x-position at that z position. For a given depth of cut, C, this error $\epsilon(\delta)$ in the x-position as a function of rotation angle δ is given by:

$$\epsilon(\delta)=X(Z+C.\delta)-X(Z)$$

In other words, there is a relative shift of profile as we move from tip to any point on the cutting face due to the x-rotation angle δ. This position error is related to the maximum value of θ by:

$$\epsilon(\delta)=C.\delta.\tan(\theta)=C.\tan(\theta).\delta. \qquad (EQ.\ 14).$$

For sinusoidal modulation in the x-direction as discussed above, the position error reduces to:

$$\epsilon(\delta)=C.A.B.\delta.$$

As can be seen, the position error $\epsilon(\delta)$ grows linearly with the rotation angle δ.

The model above provides some insights into parameter values that prevent interference. Increasing the side clearance angle allows larger slope (θ value) on the tool path without local interference. For small angles, the relationship between primary clearance angle and the allowable slope of the winding tool path is almost linear. Raising the clearance angle in cutting sinusoidal path allows larger amplitude for a given wavelength, or smaller period for fixed amplitude.

Tilting the top cutting face away from the workpiece surface (increasing the rotation angle, positive δ) effectively increase the side clearance angle in the cutting direction. Tilting the top cutting face toward the workpiece surface (reducing the rotation angle, negative δ), on the other hand, decrease the effective side clearance angle. A positive (away from workpiece surface) rotation angle δ is desired to increase the effective clearance in the cutting direction without physically increasing clearance angle on the cutting tool.

This invention provides tool geometry modification to compensate for the deviation of cut geometry form designed due to the tilting. The included angle of a V-shape cutter has to decrease to compensate for the change due to tilting (rotation angle δ increase) in order to achieve the included angle cut in the part with no tilting. In one embodiment, the present invention provides a submaster having a surface free from gouging defects caused by local and global interference.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

What is claimed is:

1. A method of determining a tool geometry and tool orientation for any prescribed path along a workpiece of a cutting tool, comprising:
    providing a parameter set, where parameters of the parameter set include tool geometry and tool orientation relative to a surface of the workpiece;
    determining values of the parameters in the parameter set such that no local interference or global interference occurs, where local interference occurs when a portion of the tool immediately adjacent a cutting edge of the tool contacts a sidewall of a groove already cut by the cutting edge, and global interference occurs when a portion of the tool away from the cutting edge contacts a sidewall of a groove already cut by the cutting edge; and
    providing a physical cutting tool and tool orientation according to the determined values of the parameters to avoid interference,
    wherein the tool path is generally along the z-direction with modulation in the x-direction, and the direction into the workpiece is perpendicular to the x-direction and z-direction,
    wherein the tool geometry includes a top face oriented toward the workpiece surface, a first side clearance face and a second side clearance face, and where the following conditions hold for all points on the first and second side clearance faces for all positions along the path:

$\gamma > \tan-1|X(Z)-X(Z-\Delta Z)/\Delta Z|$, where $\gamma$ is the side clearance angle of the first and second side clearance faces with respect to the workpiece surface, $X(Z)$ is the value of the x-coordinate for a point on one of the side clearance faces when a tip of the tool is at the position Z along the z-axis, and $Z-\Delta Z$ is the position of the tool tip at an earlier time.

2. The method of claim 1, wherein the tool path is such that the tool tip is at a depth of τ into the workpiece surface, and the following condition holds for all points on the first and second side clearance faces for all positions along the path:

$|X(Z)-X(Z-\Delta Z)| < [\tau(\tan(\gamma)/\tan(\beta))]$, where β is a front clearance angle, which is the angle an intersection line of the first and second side clearance faces makes with the workpiece surface.

3. A method of determining a tool geometry and tool orientation for any prescribed path along a workpiece of a cutting tool, comprising:
    providing a parameter set, where parameters of the parameter set include tool geometry and tool orientation relative to a surface of the workpiece;
    determining values of the parameters in the parameter set such that no local interference or global interference occurs, where local interference occurs when a portion of the tool immediately adjacent a cutting edge of the tool contacts a sidewall of a groove already cut by the cutting edge, and global interference occurs when a portion of the tool away from the cutting edge contacts a sidewall of a groove already cut by the cutting edge; and
    providing a physical cutting tool and tool orientation according to the determined values of the parameters to avoid interference,
    wherein the tool path is generally along the z-direction with modulation in the x-direction, and the direction into the workpiece is perpendicular to the x-direction and z-direction,
    wherein the tool geometry includes a top face oriented toward the workpiece surface, a first side clearance face and a second side clearance face, $\gamma$ is the side clearance angle of the first and second side clearance faces with respect to the workpiece surface before any rotation of the tool, the tool is oriented so as to be rotated about the x-axis by an angle δ such that the side clearance angle $\gamma$ becomes an effective clearance angle $\gamma_n$ defined by
    $\tan(\gamma_n)=[(\cos(\delta)\sin(\phi)-\sin(\delta)\cos(\phi)\sin(\alpha))/\cos(\phi)\sin(\alpha)]$, where α is a half included cut angle, $(\pi/2-\phi)$ is the angle between first clearance face and the top face, and where the following conditions hold for all points on the first and second side clearance faces for all positions along the path:

$\gamma_n > \tan-1|X(Z)-X(Z-\Delta Z)/\Delta Z|$, where $X(Z)$ is the value of the x-coordinate for a point on one of the side clearance faces when a tip of the tool is at the position Z along the z-axis, and $Z-\Delta Z$ is the position of the tool tip at an earlier time.

4. A method of determining a tool geometry and tool orientation for any prescribed path along a workpiece of a cutting tool, comprising:
    providing a parameter set, where parameters of the parameter set include tool geometry and tool orientation relative to a surface of the workpiece;
    determining values of the parameters in the parameter set such that no local interference or global interference occurs, where local interference occurs when a portion of the tool immediately adjacent a cutting edge of the tool contacts a sidewall of a groove already cut by the cutting edge, and global interference occurs when a portion of the tool away from the cutting edge contacts a sidewall of a groove already cut by the cutting edge; and providing a physical cutting tool and tool orientation according to the determined values of the parameters to avoid interference, wherein the tool path is generally along the z-direction with modulation in the x-direction, and the direction into the workpiece is perpendicular to the x-direction and z-direction, wherein the tool geometry includes a top face oriented toward the workpiece surface, a first side clearance face and a second side clearance face, wherein the cutting tool has a V-shaped cross section having a half included angle $\alpha$ oriented about the x-axis by an angle $\delta$ such that the cutting tool will cut modulated V grooves in the surface of the workpiece having a half included angle $\alpha_n$ defined by $\tan(\alpha_n)=[\tan(\alpha)]/\cos(\delta)$.

5. A method of determining a tool geometry and tool orientation for any prescribed path along a workpiece of a cutting tool, comprising:

providing a parameter set, where parameters of the parameter set include tool geometry and tool orientation relative to a surface of the workpiece;

determining values of the parameters in the parameter set such that no local interference or global interference occurs, where local interference occurs when a portion of the tool immediately adjacent a cutting edge of the tool contacts a sidewall of a groove already cut by the cutting edge, and global interference occurs when a portion of the tool away from the cutting edge contacts a sidewall of a groove already cut by the cutting edge; and providing a physical cutting tool and tool orientation according to the determined values of the parameters to avoid interference, wherein the tool path is generally along the z-direction with modulation in the x-direction, and the direction into the workpiece is perpendicular to the x-direction and z-direction, wherein the tool geometry includes a top face oriented toward the workpiece surface, a first side clearance face and a second side clearance face, and the cutting tool is oriented about the x-axis by an angle $\delta$, the relative x-direction deviation $\epsilon$ of a cutting tool profile from the prescribed path cut by the rotated cutting tool on the workpiece surface due to $\delta$ is given by:

$$\epsilon(\delta)=C\cdot\delta\cdot\tan(\theta)=C\cdot\tan(\theta)\cdot\delta.$$

where $\theta$ is the angle of the prescribed path with respect to the z-axis and C is the depth of cut of the cutting tool into the workpiece.

* * * * *